Figure 1:
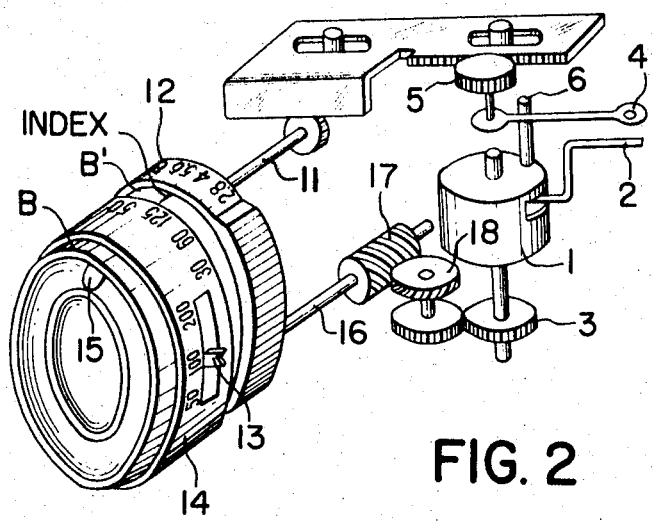

United States Patent

[11] 3,613,536

| [72] | Inventors | Tatsuya Taguchi<br>Tokyo;<br>Yoshiaki Watanabe, Fujisawa-shi, both of Japan |
|---|---|---|
| [21] | Appl. No. | 843,056 |
| [22] | Filed | July 18, 1969 |
| [45] | Patented | Oct. 19, 1971 |
| [73] | Assignee | Canon Kabushiki Kaisha<br>Tokyo, Japan |
| [32] | Priority | July 24, 1968 |
| [33] | | Japan |
| [31] | | 43/63274 |

[54] WARNING DEVICE FOR EXPOSURE METER
2 Claims, 2 Drawing Figs.

[52] U.S. Cl. .................................................. 95/10 C, 95/64 C
[51] Int. Cl. .................................................. G03b 7/04, G03b 17/18
[50] Field of Search .................................... 95/10 C, 64, 64 C

[56] References Cited
UNITED STATES PATENTS

| 2,920,542 | 1/1960 | Engelsmann | 95/10 C |
| 3,002,436 | 10/1961 | Bihlmaier | 95/10 C |
| 3,009,403 | 11/1961 | Heerklotz | 95/10 C |
| 3,097,581 | 7/1963 | Kremp et al. | 95/10 C |
| 3,427,946 | 2/1969 | Broschke et al. | 95/10 C X |

FOREIGN PATENTS

| 1,101,134 | 3/1961 | Germany | 95/10 C |
| 1,185,057 | 1/1965 | Germany | 95/10 C |
| 1,287,922 | 1/1969 | Germany | 95/10 C |

*Primary Examiner*—Samuel S. Matthews
*Assistant Examiner*—Joseph F. Peters, Jr.
*Attorney*—Ward, McElhannon, Brooks & Fitzpatrick

ABSTRACT: A warning device for an exposure meter for avoiding an erroneous photographic exposure. A restricting pin is provided at a limit point of the range of movement of the meter pointer so that the coincidence of the followup pointer with the meter pointer is avoided at the limit of said range.

PATENTED OCT 19 1971

3,613,536

WARNING DEVICE FOR EXPOSURE METER

This invention relates to a warning device for an exposure meter.

In the followup pointer-type exposure meter interlocking camera, it is known that the moving coil of the exposure meter is rotated in relation to the adjustment of the shutter speed and film sensitivity. In such a camera, when the brightness of an object to be photographed is insufficient so that the meter pointer does not move and contacts a stopper provided at the zero point of the meter, the pointer is not visible within the field. However, when the shutter speed is set at a low speed below the interlocking range, the moving coil of the meter is rotated in interlocking relation with said shutter speed-setting operation, and the pointer, which remains in contact with said stopper, is forcibly rotated to be a position at which it appears in the field. The position of the pointer under these conditions, is determined by the set value of the shutter speed and the film sensitivity regardless of the brightness. Consequently, the situation in this case seems, at a glance, as if the pointer were moved in the normal way, so that a photographer may coincide the followup pointer to the pointer of the meter to determine the stop value and thus make an improperly exposed picture.

This is also true in case an object has a higher brightness than the range of photometry of the exposure meter, i.e. the range of the exposure meter interlocked with the camera.

For avoiding such defects, in the past, it was proposed that a warning plate appear in the observation field of the pointer, or the pointer was covered as the brightness of an object exceeded the upper or lower limit of the interlocking range.

An object of this invention is to provide a novel means to avoid said defect.

In accordance with the present invention, when a pointer of the meter locates at a position near to the zero or maximum point, the movement of the followup pointer is restricted by a restricting member so as to avoid the coincidence of the followup pointer with the pointer of the meter which is actuated by the moving coil of the meter.

Figure 2:
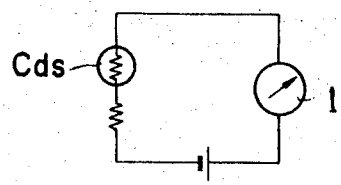

The invention will be more apparent from the following description referring to an embodiment shown in the attached drawing, in which:

FIG. 1 shows an embodiment of the present invention; and
FIG. 2 shows a conventional exposure meter circuit.

In FIGS. 1 and 2, a meter case 1 including a moving coil (not shown) is rotatably supported by a camera body as well known in the art. A pointer 2 extends from meter case 1, and is moveable by the meter coil, and a gear 3 is fixed to a rotary shaft extended from the coil in the meter case 1. The gear 3 is interconnected with a worm wheel 18 through another gear as shown. The worm wheel 18 is meshed with a worm 17 provided on a shaft 16, of which the leading end is provided with a pinion (not shown) which is meshed with an internal gear provided at a film sensitivity setting plate 13, which is rotatable and integral with a shutter ring 14 by a well-known click-stop means. A collective lens 15 is provided at a position in front of a photosensitive member (not shown), e.g. CdS. Portions B and B' are fixing members, respectively. A shaft 11 has a pinion (not shown) at the leading end which is meshed with an internal gear provided within a stop ring 12, of which the movement is transmitted to a gear 5 as shown to move a followup pointer 4 to coincide with the position of the pointer 2 of the meter to obtain an appropriate exposure value.

In accordance with this embodiment, a control pin 6 is mounted on the upper surface of the meter case 1 at a position corresponding to the original position, i.e. the zero position, of the movement of the pointer 2 of the meter. The control pin 6 is contactable by the followup pointer 4.

When the film sensitivity and the shutter speed are set by adjusting the film sensitivity setting plate 13 and the shutter ring 14 to meet with the index and the meter pointer 2 locates at a position within the observation field, the stop ring 12 is rotated to transmit its rotation to the gear 5 to move the followup pointer 4 until it reaches a position coinciding with the position of the pointer 2, so as to obtain an appropriate exposure value.

When an object to be photographed has an insufficient brightness so that it is below the lower limit of the range of photometry of the meter, the pointer 2 remains stopped at the original or zero position of rotation of the pointer. However, when the shutter speed is set at a low speed, the pointer 2 comes into the observation field as the meter case 1 rotates and it seems as if it were possible to make a satisfactory photograph. In this state, when the stop ring 12 is rotated to move the followup pointer 4, it contacts the restricting pin 6 just before it coincides with the pointer 2, and it is not possible to bring it into coincidence with the pointer 2 event though the stop ring 12 is further rotated. Thus, the photographer is warned that the brightness of the object to be photographed is out of the photometry range of the meter.

As explained above, in accordance with the present invention, with a very simple structure, a warning device is provided to indicate to the photographer when the out of the photometry range of the meter so that there is no fear of an erroneous exposure. FIG. 2 shows an exposure meter circuit which is conventional in the art.

What is claimed is:

1. In a camera having a built-in exposure meter including a pointer, stop valve regulating means, shutter speed and film sensitivity setting means, a stop ring, a followup pointer, and means operable upon adjustment of the stop ring to adjust the followup pointer into coincidence with the meter pointer when the film sensitivity and shutter speed are set, means comprising a restricting member positioned at a limit point adjacent an end of the range of movement of the meter pointer to restrict movement of the followup pointer to prevent same from coinciding with the meter pointer at the limit point upon adjustment of the stop ring when the light reflected from the object to be photographed is beyond the photometry range of the meter.

2. A warning means according to claim 1, in which restricting members are provided at both ends of the range of the movement of the meter pointer.